US012500367B2

(12) United States Patent
Sakai

(10) Patent No.: US 12,500,367 B2
(45) Date of Patent: Dec. 16, 2025

(54) TERMINAL UNIT WITH IMPROVED PROTECTION

(71) Applicant: SUMITOMO WIRING SYSTEMS, LTD., Mie (JP)

(72) Inventor: Hiroki Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 335 days.

(21) Appl. No.: 18/027,565

(22) PCT Filed: Aug. 3, 2021

(86) PCT No.: PCT/JP2021/028731

§ 371 (c)(1),
(2) Date: Mar. 21, 2023

(87) PCT Pub. No.: WO2022/074924

PCT Pub. Date: Apr. 14, 2022

(65) Prior Publication Data

US 2023/0378682 A1 Nov. 23, 2023

(30) Foreign Application Priority Data

Oct. 6, 2020 (JP) ................................ 2020-168838

(51) Int. Cl.
*H01R 13/44* (2006.01)
*H01R 13/05* (2006.01)

(52) U.S. Cl.
CPC ............. *H01R 13/44* (2013.01); *H01R 13/05* (2013.01); *H01R 2201/26* (2013.01)

(58) Field of Classification Search
CPC .... H01R 13/443; H01R 13/447; H01R 13/44; H01R 13/4538; H01R 13/05; H01R 2201/26; H01R 13/04

(Continued)

(56) References Cited

U.S. PATENT DOCUMENTS 7,946,749 B2 * 5/2011 Takata .............. G02F 1/133604 362/217.08
11,387,589 B2 * 7/2022 Shimizu ................. H01R 13/44

(Continued)

FOREIGN PATENT DOCUMENTS

CN 108233123 A 6/2018
DE 102015107304 A1 11/2016

(Continued)

OTHER PUBLICATIONS

English Translation of WO2020100731 (Year: 2025).*
International Search Report issued on Oct. 19, 2021 for WO 2022/074924 A1 (6 pages).

*Primary Examiner* — Tulsidas C Patel
*Assistant Examiner* — Carlos E Lopez-Pagan
(74) *Attorney, Agent, or Firm* — Venjuris, P.C.

(57) ABSTRACT

A terminal unit is provided with a plate-like terminal having a tip side extending in a first direction and a protecting member to be fixed to the tip side of the terminal. The terminal includes a first tip part and claw engaging portions. The protecting member includes a protecting body portion formed with an insertion recess, into which the first tip part is inserted, arm portions extending in a second direction from the both sides in the width direction of the protecting body portion and claw portions projecting toward each other from second tip parts of a pair of the arm portions. The protecting member is fixed to the terminal by fitting the claw portions into the claw engaging portions with the first tip part inserted in the insertion recess. The arm portions extend from an end part of the protecting body portion on the first direction side.

8 Claims, 3 Drawing Sheets

(58) Field of Classification Search
USPC .......................................... 439/660, 148, 149
See application file for complete search history.

(56) References Cited

U.S. PATENT DOCUMENTS

| | | | | |
|---|---|---|---|---|
| 11,539,149 | B2 * | 12/2022 | Kobayashi | H01R 9/24 |
| 2010/0128466 | A1 | 5/2010 | Takata et al. | |
| 2019/0252821 | A1 * | 8/2019 | Kessler | H02G 3/083 |

FOREIGN PATENT DOCUMENTS

| | | | | |
|---|---|---|---|---|
| JP | 2001-266986 A | | 9/2001 | |
| JP | 2014-078402 A | | 5/2014 | |
| JP | 2014-179290 A | | 9/2014 | |
| JP | 2020-095902 A | | 6/2020 | |
| WO | 2020/003566 A1 | | 1/2020 | |
| WO | WO-2020100731 A1 | * | 5/2020 | G06F 16/90339 |

* cited by examiner

TERMINAL UNIT WITH IMPROVED PROTECTION

CROSS REFERENCE TO RELATED APPLICATIONS

This application is a national phase of PCT application No. PCT/JP2021/028731, filed on 3 Aug. 2021, which claims priority from Japanese patent application No. 2020-168838, filed on 6 Oct. 2020, all of which are incorporated herein by reference.

TECHNICAL FIELD

The present disclosure relates to a terminal unit.

Background

Conventionally, a vehicle such as a hybrid vehicle or electric vehicle is provided with in-vehicle devices such as a high-voltage battery and an inverter. The in-vehicle devices are connected via a wiring harness and connectors. Since there is a possibility of an electric shock if the tips of male terminals provided in such connectors touch a finger or the like, electric shock preventive measures are taken for some of the male terminals. The male terminals, for which the electric shock preventive measures are taken, include a terminal unit provided with a terminal made of a metal plate material and extending in a first direction and a protecting member made of an insulating material and fixed to a tip side of the terminal (see, for example, Patent Document 1 (FIG. 12 and the like)). This protecting member includes a protecting body portion formed with an insertion recess, into which the tip part of the terminal is inserted, arm portions extending in a second direction opposite to the first direction from both sides in a width direction of the protecting body portion and claw portions projecting toward each other from tip parts of the arm portions. Further, the terminal includes claw engaging portions, which are recessed from the widthwise sides and into which the claw portions are fit. The protecting member is fixed to the terminal by fitting the claw portions into the claw engaging portions with the tip part of the terminal inserted in the insertion recess.

PRIOR ART DOCUMENT

Patent Document

Patent Document 1: WO 2020/003566 A1

SUMMARY OF THE INVENTION

Problem to be Solved

However, in the terminal unit as described above, the arm portions need to be deflected in assembling the protecting member with the terminal and there has been a problem that a large stress is applied particularly to base end parts of the arm portions and the arm portions are easily broken when the arm portions are deflected.

The present disclosure was developed to solve the above problem and aims to provide a terminal unit capable of suppressing the damage of a protecting member.

Means to Solve the Problem

The present disclosure is directed to a terminal unit with a plate-like terminal having a tip side extending in a first direction, and a protecting member to be fixed to the tip side of the terminal, a direction orthogonal to the first direction and a plate thickness direction of the terminal being a width direction, the terminal including a first tip part, the first tip part being an end part on a first direction side, and claw engaging portions recessed from both sides in the width direction, the protecting member including a protecting body portion formed with an insertion recess, the first tip part being inserted into the insertion recess, arm portions extending in a second direction opposite to the first direction from the both sides in the width direction of the protecting body portion and claw portions projecting toward each other from second tip parts to be fit into the claw engaging portions, the second tip parts being end parts of a pair of the arm portions on a second direction side, the protecting member being fixed to the terminal by fitting the claw portions into the claw engaging portions with the first tip part inserted in the insertion recess, and the arm portions extending from positions more on the first direction side than an end part of the protecting body portion on the second direction side.

Effect of the Invention

According to the terminal unit of the present disclosure, it is possible to suppress the damage of the protecting member.

DETAILED DESCRIPTION TO EXECUTE THE INVENTION

Description of Embodiments of Present Disclosure

Figure 1:
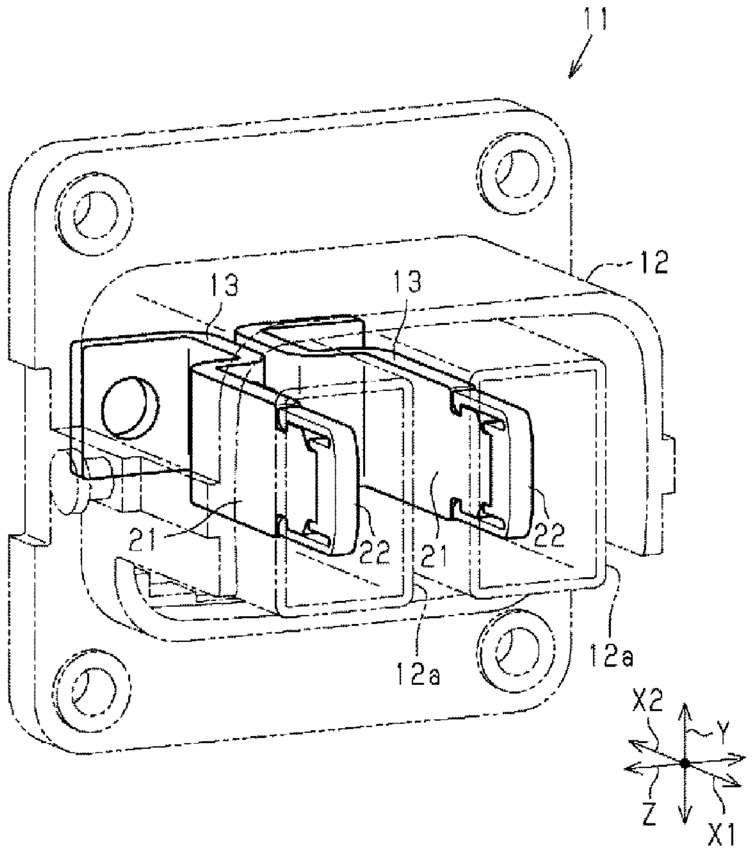
FIG. 1 is a perspective view showing a connector in one embodiment.

First, embodiments of the present disclosure are listed and described.

[1] The terminal unit of the present disclosure is provided with a plate-like terminal having a tip side extending in a first direction, and a protecting member to be fixed to the tip side of the terminal, a direction orthogonal to the first direction and a plate thickness direction of the terminal being a width direction, the terminal including a first tip part, the first tip part being an end part on a first direction side, and claw engaging portions recessed from both sides in the width direction, the protecting member including a protecting body portion formed with an insertion recess, the first tip part being inserted into the insertion recess, arm portions extending in a second direction opposite to the first direction from the both sides in the width direction of the protecting body portion and claw portions projecting toward each other from second tip parts to be fit into the claw engaging portions, the second tip parts being end parts of a pair of the arm portions on a second direction side, the protecting member being fixed to the terminal by fitting the claw portions into the claw engaging portions with the first tip part inserted in the insertion recess, and the arm portions extending from positions more on the first direction side than an end part of the protecting body portion on the second direction side.

According to this configuration, since the arm portions extend from the positions more on the first direction side than the end part of the protecting body portion on the second direction side, the arm portions are longer as compared to the case where the arm portions extend from the end part of the protecting body portion on the second direction side. Thus, the arm portions are easily deflected. Therefore, even if the arm portions are deflected, for example, in fixing the protecting member to the terminal, it can be suppressed that a large stress is applied particularly to base end parts of the arm portions. Hence, the damage of the protecting member can be suppressed.

[2] Preferably, the arm portions extend from an end part of the protecting body portion on the first direction side.

According to this configuration, since the arm portions extend from the end part of the protecting body portion on the first direction side, the arm portions are longer as compared to the case where the arm portions extend from positions between the end part on the first direction side and the end part on the second direction side of the protecting body portion. Thus, the arm portions are more easily deflected. Therefore, even if the arm portions are deflected, for example, in fixing the protecting member to the terminal, it can be suppressed that a large stress is applied particularly to the base end parts of the arm portions. Hence, the damage of the protecting member can be more suppressed.

[3] Preferably, the protecting member has protecting member inclined surfaces facing each other, a width between the protecting member inclined surfaces being gradually reduced toward the insertion recess.

According to this configuration, since the protecting member has the protecting member inclined surfaces facing each other, the width between which is gradually reduced toward the insertion recess, the tip part of the terminal is smoothly inserted into the insertion recess by being guided by the protecting member inclined surfaces in assembling the protecting member with the terminal. Therefore, assembling is facilitated.

[4] Preferably, the terminal has terminal inclined surfaces, a width between the terminal inclined surfaces being gradually reduced toward the first tip part.

According to this configuration, since the terminal has the terminal inclined surfaces, the width between which is gradually reduced toward the first tip part, tip parts of the arm portions are smoothly deflected outward in the width direction, in other words, toward sides away from each other, by being guided by the terminal inclined surfaces in assembling the protecting member with the terminal. Therefore, assembling is facilitated.

[5] Preferably, the terminal inclined surfaces are disposed between the claw engaging portions and the first tip part.

According to this configuration, the protecting member can be smoothly assembled with the terminal because of such a positional relationship that the terminal inclined surfaces are disposed between the claw engaging portions and the first tip part.

[6] Preferably, the first tip part includes a press-fit portion to be press-fit into the insertion recess.

According to this configuration, since the first tip part includes the press-fit portion to be press-fit into the insertion recess, the rattling of the protecting body portion with respect to the terminal is suppressed and, eventually, the detachment of the protecting member from the terminal is suppressed.

Details of Embodiment of Present Disclosure

A specific example of a terminal unit of the present disclosure is described below with reference to the drawings. Some of components may be shown in an exaggerated or simplified manner for the convenience of description in each figure. Further, a dimension ratio of each part may be different in each figure. "Parallel" and "orthogonal" in this specification mean not only strictly parallel and orthogonal, but also substantially parallel and orthogonal within a range in which functions and effects in this embodiment are achieved. Note that the present invention is not limited to these illustrations, but is represented by claims and intended to include all changes in the scope of claims and in the meaning and scope of equivalents.

Configuration of Connector 11

As shown in FIG. 1, a connector 11 is provided with a connector housing 12 and a plurality of terminal units 13 fixed in the connector housing 12. The connector 11 is provided in a vehicle. For example, the vehicle is provided with in-vehicle devices such as a high-voltage battery and an inverter, and those in-vehicle devices are connected via a wiring harness. The connector 11 is provided as a component for connecting the in-vehicle device and the wiring harness.

The connector housing 12 includes tubular portions 12*a* open to outside. The terminal unit 13 is so provided that a tip side thereof is exposed to outside through an opening of the tubular portion 12*a* while being accommodated in the connection housing 12. In this embodiment, two tubular portions 12*a* and two terminal units 13 are provided.

Configuration of Terminal Unit 13

As shown in FIGS. 1 to 4, the terminal unit 13 is provided with a terminal 21 and a protecting member 22. The terminal 21 is plate-like. The terminal 21 is made of a metal plate material. A tip side of the terminal 21 extends in a first direction X1. The terminal 21 is so arranged that the first direction X1, which is an extending direction of the tip side, coincides with an outward direction from the opening of the tubular portion 12*a*. The protecting member 22 is made of an insulating material. In particular, the protecting member 22 is made of an insulating resin material. The protecting member 22 is fixed to the tip side of the terminal 21, i.e. a first direction X side of the terminal 21.

Configuration of Terminal 21

The terminal 21 includes claw engaging portions 21*a* recessed from both widthwise sides on the tip side thereof. Note that a width direction Y is a direction orthogonal to the first direction X1, in which the terminal 21 extends, and a plate thickness direction Z of the terminal 21. Further, the terminal 21 includes a narrow portion 21*b* on a side closer to the tip than the claw engaging portions 21*a*. The narrow portion 21*b* is wider than a width between the claw engaging portions 21*a* and narrower than a base end side of the terminal 21.

Further, the terminal 21 has terminal inclined surfaces 21*d* on a side closer to the tip than the narrow portion 21*b*. A width between the terminal inclined surfaces 21*d* is gradually reduced toward a first tip part 21*c*, in other words, in the first direction X1. The terminal inclined surfaces 21*d* are disposed between the claw engaging portions 21*a* and the first tip part 21*c*. Note that the first tip part 21*c* is an end part on the first direction X1 side of the terminal 21. The first tip part 21*c* of the terminal 21 is formed to extend with a constant width in the first direction X1 from the tips of the terminal inclined surfaces 21*d*.

Figure 4:
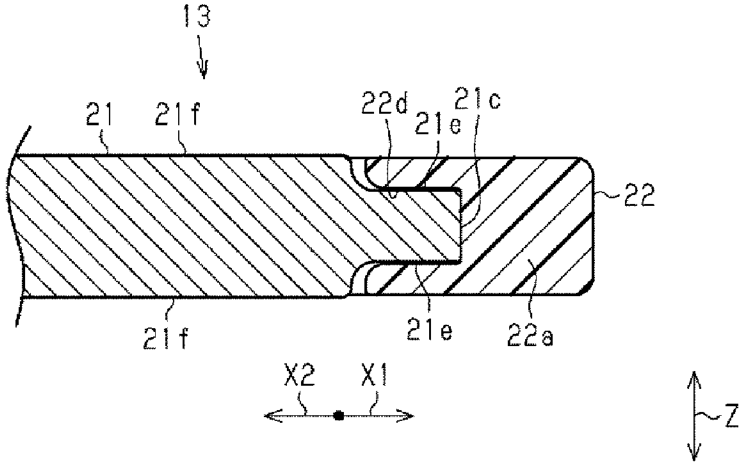
FIG. 4 is a section along 4-4 of FIG. 2.

Further, as shown in FIG. 4, the first tip part 21*c* of the terminal 21 is so provided that there are steps between both end surfaces 21*e* in the plate thickness direction Z and both end surfaces 21*f* in another part of the terminal 21, and a plate thickness thereof is set to be smaller than that of the other part.

Figure 3:
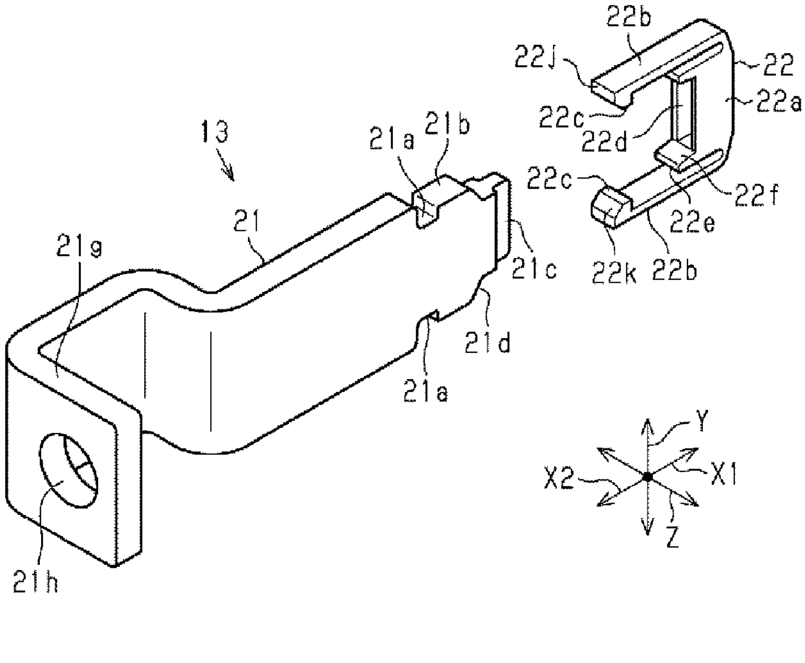
FIG. 3 is an exploded perspective view of the terminal unit in the embodiment.

Note that, as shown in FIG. 3, the base end side of the terminal 21 of this embodiment is bent. Further, a base end part 21*g* of the terminal 21 is formed with a connection hole 21*h*. An unillustrated harness is connected to the base end part 21*g* of the terminal 21 via a bolt or the like passed through the connection hole 21*h* and threadably engaged with a nut.

Configuration of Protecting Member 22

The protecting member 22 includes a protecting body portion 22*a*, arm portions 22*b* and claw portions 22*c*. The protecting body portion 22*a*, the arm portions 22*b* and the claw portions 22*c* are integrally molded. That is, the protecting member 22 is an integrally molded product.

The protecting body portion 22*a* is formed into a substantially rectangular parallelepiped shape. In the protecting body portion 22*a*, an insertion recess 22*d*, into which the first tip part 21*c* of the terminal 21 is inserted, is formed on a second direction X2 side opposite to the first direction X1 side. A width of the insertion recess 22*d* is set to be slightly smaller than that of the first tip part 21*c* in a state before the first tip part 21*c* of the terminal 21 is inserted. In this way, the first tip part 21*c* of the terminal 21 serves as a press-fit portion to be press-fit into the insertion recess 22*d*.

Further, in the protecting body portion 22*a*, projecting portions 22*e* projecting in the second direction X1 are provided on both sides in the width direction on the second direction X2 side. A pair of the projecting portions 22*e* are provided with protecting member inclined surfaces 22*f*. A width between the protecting member inclined surfaces 22*f* facing each other is gradually reduced toward the insertion recess 22*d*.

The arm portions 22*b* extend in the second direction X2 from the both sides in the width direction of the protecting body portion 22*a*. The arm portions 22*b* extend from positions more on the first direction X1 side than an end part of the protecting body portion 22*a* on the second direction X2 side. In particular, the arm portions 22*b* of this embodiment extend from an end part of the protecting body portion 22*a* on the first direction X1 side. The arm portion 22*b* includes an outward extending portion 22*g* slightly extending outward in the width direction Y first from the widthwise side of the protecting body portion 22*a* and an arm body portion 22*h* extending in the second direction X2 from the tip of the outward extending portion 22*g*. The arm body portion 22*h* is provided to form a small gap between the protecting body portion 22*a* and the arm body portion 22*h* in the width direction Y.

The claw portions 22*c* project toward each other from second tip parts 22*j*, which are end parts of the pair of arm portions 22*b* on the second direction X2 side. The pair of claw portions 22*c* are provided with claw portion inclined surfaces 22*k*. A width between the claw portion inclined surfaces 22*k* facing each other is gradually reduced toward the first direction X1 side. The claw portions 22*c* are formed to be fit into the claw engaging portions 21*a* of the terminal 21.

The protecting member 22 is fixed to the terminal 21 by fitting the claw portions 22*c* into the claw engaging portions 21*a* with the first tip part 21*c* of the terminal 21 inserted in the insertion recess 22*d*.

Next, functions of the terminal unit 13 configured as described above are described.

Figure 5:
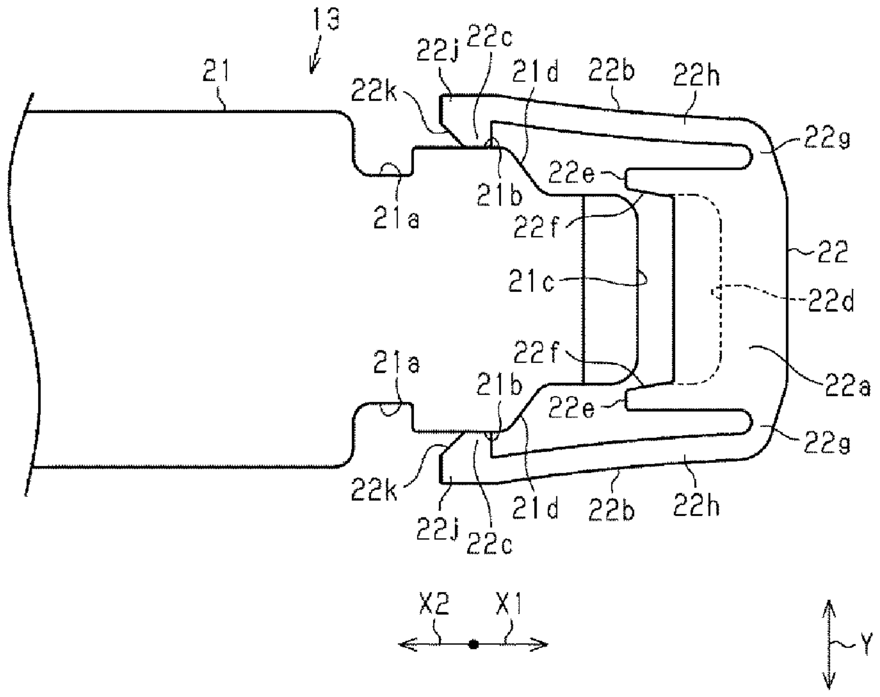
FIG. 5 is a partial plan view showing the assembling of the terminal unit in the embodiment.

As shown in FIG. 5, as the protecting member 22 is moved in the second direction X2 with respect to the terminal 21 in assembling the protecting member 22 with the terminal 21, the second tip parts 22*j* of the arm portions 22*b* are guided together with the claw portions 22*c* by the terminal inclined surfaces 21*d*, thereby being deflected outward in the width direction Y. As the protecting member 22 is further moved in the second direction X2 with respect to the terminal 21, the first tip part 21*c* of the terminal 21 is inserted into the insertion recess 22*d* and the claw portions 22*c* are fit into the claw engaging portions 21*a*, whereby the protecting member 22 is fixed to the terminal 21.

Next, effects of the above embodiment are described below.

(1) Since extending from the positions more on the first direction X1 side than the end part of the protecting body portion 22*a* on the second direction X2 side, the arm portions 22*b* are longer as compared to the case where the arm portions 22*b* extend from the end part of the protecting body portion 22*a* on the second direction X2 side. Thus, the arm portions 22*b* are easily deflected. Therefore, even if the arm portions 22*b* are deflected in fixing the protecting member 22 to the terminal 21, it can be suppressed that a large stress is applied particularly to base end parts of the arm portions 22*b*. Hence, the damage of the protecting member 22 can be suppressed.

(2) Since extending from the end part of the protecting body portion 22*a* on the first direction X1 side, the arm portions 22*b* are longer as compared to the case where the arm portions 22*b* extend from positions between the end part on the first direction X1 side and the end part on the second direction X2 side of the protecting body portion 22*a*. Thus, the arm portions 22*b* are more easily deflected. Therefore, even if the arm portions 22*b* are deflected in fixing the protecting member 22 to the terminal 21, it can be suppressed that a large stress is applied particularly to the base end parts of the arm portions 22*b*. Hence, the damage of the protecting member 22 can be more suppressed.

(3) The protecting member 22 has the pair of protecting member inclined surfaces 22*f*, the width between which is gradually reduced toward the insertion recess 22*d*. Thus, in assembling the protecting member 22 with the terminal 21, the first tip part 21*c* of the terminal 21 is smoothly inserted into the insertion recess 22*d* by being guided by the protecting member inclined surfaces 22*f*. Therefore, assembling is facilitated.

(4) The terminal 21 has the terminal inclined surfaces 21*d*, the width between which is gradually reduced toward the first tip part 21*c*. Thus, in assembling the protecting member 22 with the terminal 21, the second tip parts 22*j* of the arm portions 22*b* are smoothly deflected outward in the width direction Y, i.e. toward sides away from each other, by being guided by the terminal inclined surfaces 21*d*. Therefore, assembling is facilitated.

(5) By such a positional relationship that the terminal inclined surfaces 21*d* are disposed between the claw engaging portions 21*a* and the first tip part 21*c*, the effect described in (4) described above can be obtained and the protecting member 22 can be smoothly assembled with the terminal 21.

(6) The claw portions 22 have the claw portion inclined surfaces 22*k*, the width between which is gradually reduced in the first direction X1. Thus, in assembling the protecting member 22 with the claw portion 22, the second tip parts 22*c* of the arm portions 22*b* are smoothly deflected outward in the width direction Y, i.e. toward the sides away from each other, by being guided by the claw portion inclined surfaces 22*k*. Therefore, assembling is facilitated.

(7) Since the first tip part 21*c* of the terminal 21 includes the press-fit portion to be press-fit into the insertion recess 22*d*, the rattling of the protecting body portion 22*a* with respect to the terminal 21 is suppressed and, eventually, the detachment of the protecting member 22 from the terminal 21 is suppressed.

This embodiment can be modified and carried out as follows. This embodiment and the following modifications can be carried out in combination without technically contradicting each other.

Although the arm portions 22*b* extend from the end part of the protecting body portion 22*a* on the first direction X1 side in the above embodiment, there is no limitation to this and the arm portions 22 may be configured to extend from positions between the end part on the first direction X1 side and the end part on the second direction X2 side of the protecting body portion 22*a*. Even if this configuration is adopted, an effect similar to the effect (1) of the above embodiment can be obtained.

Although the protecting member 22 has the pair of protecting member inclined surfaces 22*f* facing each other, the width between which is gradually reduced toward the insertion recess 22*d*, in the above embodiment, there is no limitation to this. For example, the protecting member 22 may not include the protecting member inclined surfaces 22*f* and the projecting portions 22*e*.

Although the terminal 21 has the terminal inclined surfaces 21*d*, the width between which is gradually reduced toward the first tip part 21*c*, in the above embodiment, there is no limitation to this. For example, the terminal 21 may not have the terminal inclined surfaces 21*d*.

Although the claw portions 22*c* have the claw portion inclined surfaces 22*k* facing each other, the width between which is gradually reduced toward the first direction X1 side, in the above embodiment, there is no limitation to this. For example, the claw portions 22*c* may not have the claw portion inclined surfaces 22*k*.

Although the first tip part 21*c* of the terminal 21 serves as the press-fit portion to be press-fit into the insertion recess 22d in the above embodiment, there is no limitation to this and the first tip part 21*c* may be inserted into the insertion recess 22*d* without being press-fit. Further, although the first tip part 21*c* serves as the press-fit portion to be press-fit into the insertion recess 22*d* while being pressed into contact with the insertion recess 22*d* in the width direction Y in the above embodiment, there is no limitation to this and the first tip part 21*c* may serve as a press-fit portion to be press-fit into the insertion recess 22d while being pressed into contact with the insertion recess 22*d* in the plate thickness direction Z. The first tip part 21*c* may be modified into another configuration as long as including a part of the press-fit portion to be press-fit into the insertion recess 22*d*. If the first tip part 21*c* includes the press-fit portion, the rattling of the protecting body portion 22*a* with respect to the terminal 21 can be suppressed.

Although the arm portion 22*b* includes the outward extending portion 22*g* slightly extending outward in the width direction Y first from the widthwise side of the protecting body portion 22*a* and the arm body portion 22*h* extending in the second direction X2 from the tip of the outward extending portion 22*g* in the above embodiment, the arm portion 22*b* may have another configuration. For example, the arm portion 22*b* may extend in an oblique direction to extend in the second direction X2 while extending outward in the width direction Y from the widthwise side of the protecting body portion 22*a*.

Although the base end side of the terminal 21 is bent in the above embodiment, there is no limitation to this. For example, the base end side may be not bent. Further, although the base end part 21*g* of the terminal 21 is formed with the connection hole 21*h* in the above embodiment, there is no limitation to this and the base end part 21*g* may be shaped such that the connection hole 21*h* is not formed.

Although the connector 11 includes two terminal units 13 in the above embodiment, there is no limitation to this and the connector 11 may include only one terminal unit 13 or three or more terminal units 13.

For example, as in the above embodiment, the width between the pair of arm portions 22*b* of the protecting member 22 may be equal to the width of the narrow portion 21*b* of the terminal 21.

For example, as in the above embodiment, the width between the pair of projecting portions 22*e* of the protecting member 22 may be equal to or wider than the width of the first tip part 21*c* of the terminal 21 in the end part on the second direction X2 side.

For example, as in the above embodiment, the projecting portions 22*e* of the protecting member 22 may project in the second direction X2 from both sides in the width direction of the insertion recess 22*d*.

For example, as in the above embodiment, an angle of inclination of the claw portion inclined surface 22*k* of the protecting member 22 with respect to a YZ plane may be equal to that of the terminal inclined surface 21*d* of the terminal 21 with respect to the YZ plane. In this case, in mounting the protecting member 22 on the terminal 21, two claw portion inclined surfaces 22*k* separated in the Y direction can respectively come into surface contact with the two terminal inclined surfaces 21*d* of the terminal 21. Thus, an inserting direction of the protecting member 22 to the terminal 21 is stabilized, wherefore the protecting member 22 can be smoothly assembled with the terminal 21.

Figure 2:
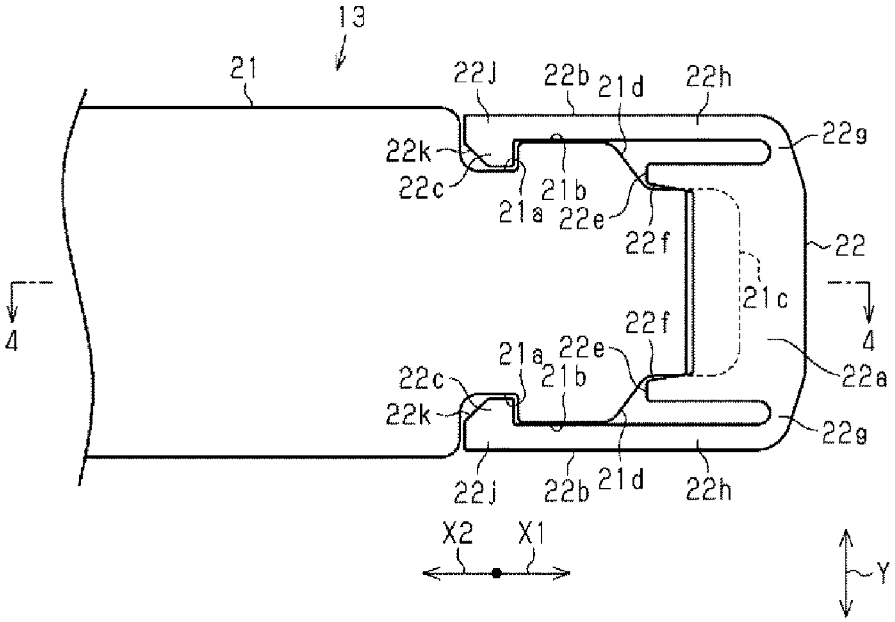
FIG. 2 is a partial plan view of a terminal unit in the embodiment.

The terminal 21 in the shown embodiment can be manufactured, for example, from a metal plate having a first plate thickness. This first plate thickness may be a plate thickness between the end surfaces 21*f* of the terminal 21. A plate thickness between the both end surfaces 21*e* of the first tip part 21*c* of the terminal 21 may be smaller than the first plate thickness and may be called a second plate thickness. For example, as shown in FIGS. 2 and 4, the terminal 21 may include a metal plate body (both end surfaces 21*f*) having the first plate thickness and a tip part (first tip part 21*c*) having the second plate thickness smaller than the first plate thickness. The both end surfaces 21*f* of the terminal 21 may be called both end surface 21*f* of the metal plate body of the terminal 21. This metal plate body may be called a non-tip part except the first tip part 21*c*, out of the terminal 21. For example, as shown in FIG. 4, a maximum thickness (e.g. a thickness of the protecting body portion 22*a*) of the protecting member 22 in the plate thickness direction Z may be equal to the first plate thickness of the terminal 21.

For example, as shown in FIGS. 2 and 4, the insertion recess 22*d* of the protecting member 22 may be configured to entirely accommodate only the first tip part 21*c* of the terminal 21 with the protecting member 22 completely assembled with the plate-like terminal 21. For example, with the protecting member 22 completely assembled with the plate-like terminal 21, the protecting member 22 can cover the both end surfaces 21*e* of the first tip part 21*c* of the terminal 21 and the both end surfaces 21*f* of the metal plate body of the terminal 21 (non-tip part of the terminal 21) except the first tip part 21*c* of the terminal 21 may be exposed from the protecting member 22 without being covered by the protecting member 22.

LIST OF REFERENCE NUMERALS

11 connector
12 connector housing
12*a* tubular portion
13 terminal unit
21 terminal
21*a* claw engaging portion
21*b* narrow portion
21*c* first tip part
21*d* terminal inclined surface
21*e* end surface
21*f* end surface
21*g* base end part
21*h* connection hole
22 protecting member
22*a* protecting body portion
22*b* arm portion
22*c* claw portion
22*d* insertion recess
22*e* projecting portion
22*f* protecting member inclined surface
22*g* outward extending portion
22*h* arm body portion
22*j* second tip part
22*k* claw portion inclined surface
X1 first direction
X2 second direction
Y width direction
Z plate thickness direction

What is claimed is:

1. A terminal unit, comprising:

a plate-like terminal having a tip side extending in a first direction; and a protecting member to be fixed to the tip side of the terminal, a direction orthogonal to the first direction and a plate thickness direction of the terminal being a width direction, the terminal including a first tip portion, the first tip portion being an end portion on a first direction side, and claw engaging portions recessed from both sides in the width direction, the protecting portion including a protecting body portion formed with an insertion recess, the first tip portion being inserted into the insertion recess, arm portions extending in a second direction opposite to the first direction from the both sides in the width direction of the protecting body portion and claw portions projecting toward each other from second tip portions to be fit into the claw engaging portions, the second tip portions being end portions of a pair of the arm portions on a second direction side, the protecting portion being fixed to the terminal by fitting the claw portions into the claw engaging portions with the first tip portion inserted in the insertion recess, wherein each of the arm portions includes:

an outward extending portion extending outwardly in the width direction from the protecting body portion; and an arm body portion extending in the second direction from the outward extending portion, and a gap is defined, in the width direction, between the protecting body portion and each of the arm body portions.

2. The terminal unit of claim 1, wherein the arm portions extend from an end portion of the protecting body portion on the first direction side.

3. The terminal unit of claim 1, wherein the first tip portion includes a press-fit portion to be press-fit into the insertion recess.

4. The terminal unit of claim 1, wherein the outward extending portions extend from portions of the protecting body portion more on the first direction side than an end portion of the protecting body portion on the second direction side.

5. The terminal unit of claim 1, wherein the protecting portion has a pair of protecting inclined surfaces facing each other, a width between the protecting inclined surfaces being gradually reduced toward the insertion recess.

6. The terminal unit of claim 5, wherein the pair of protecting inclined surfaces are between the gaps defined between the protecting body portion and each of the arm body portions.

7. The terminal unit of claim 1, wherein the terminal has terminal inclined surfaces, a width between the terminal inclined surfaces being gradually reduced toward the first tip portion.

8. The terminal unit of claim 7, wherein the terminal inclined surfaces are disposed between the claw engaging portions and the first tip portion.

* * * * *